INVENTOR.
PHILIP SHUSTER
ATTORNEY.

INVENTOR.
PHILIP SHUSTER
BY
Irving Seidman
ATTORNEY.

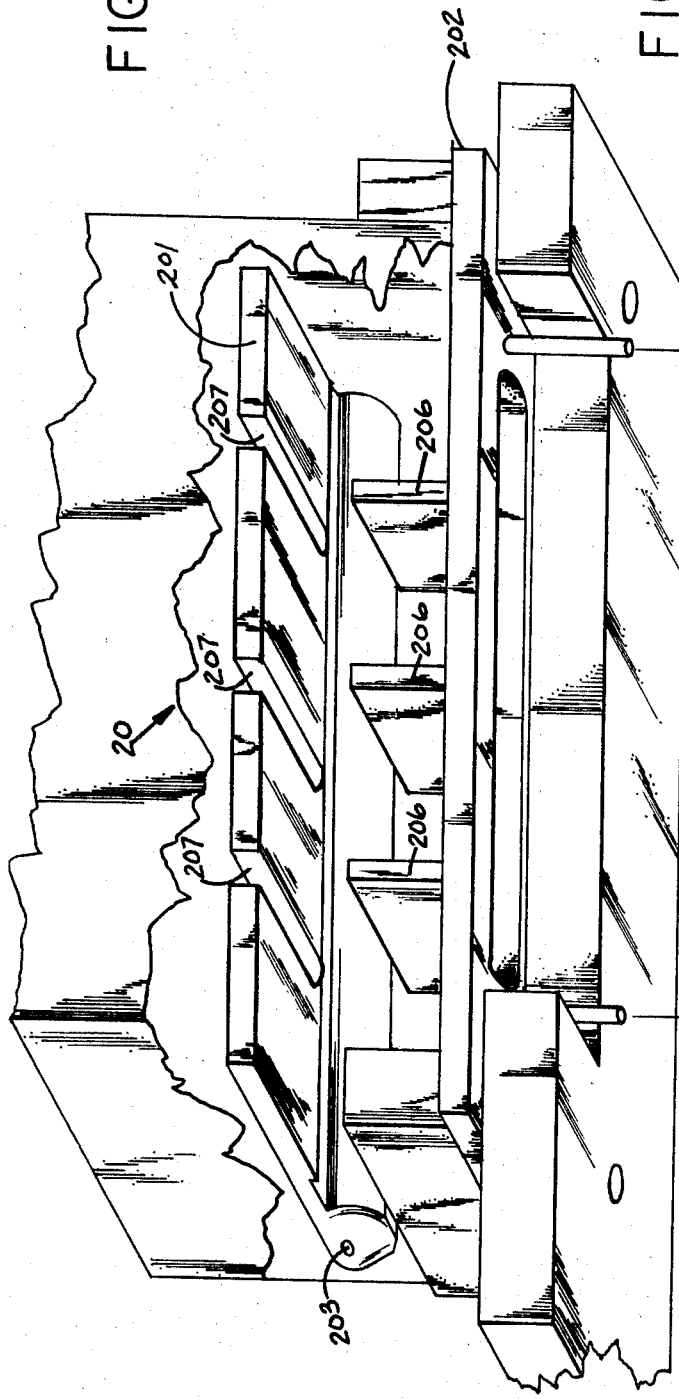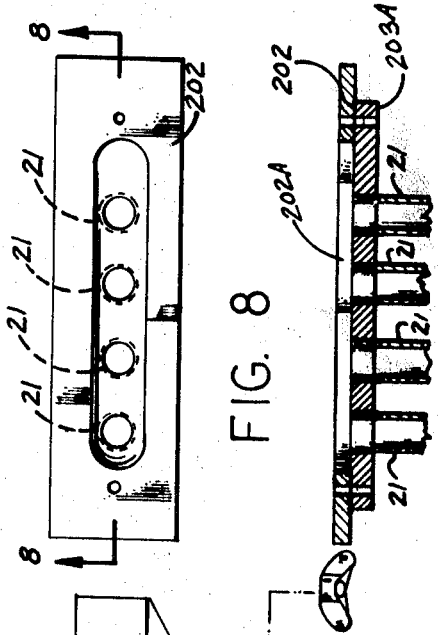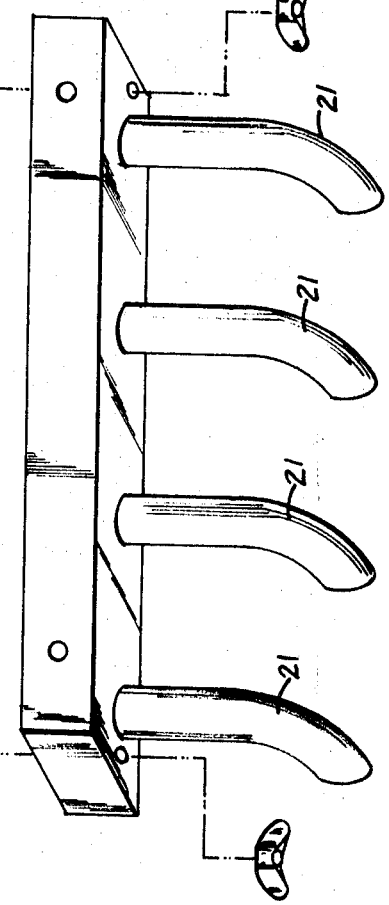

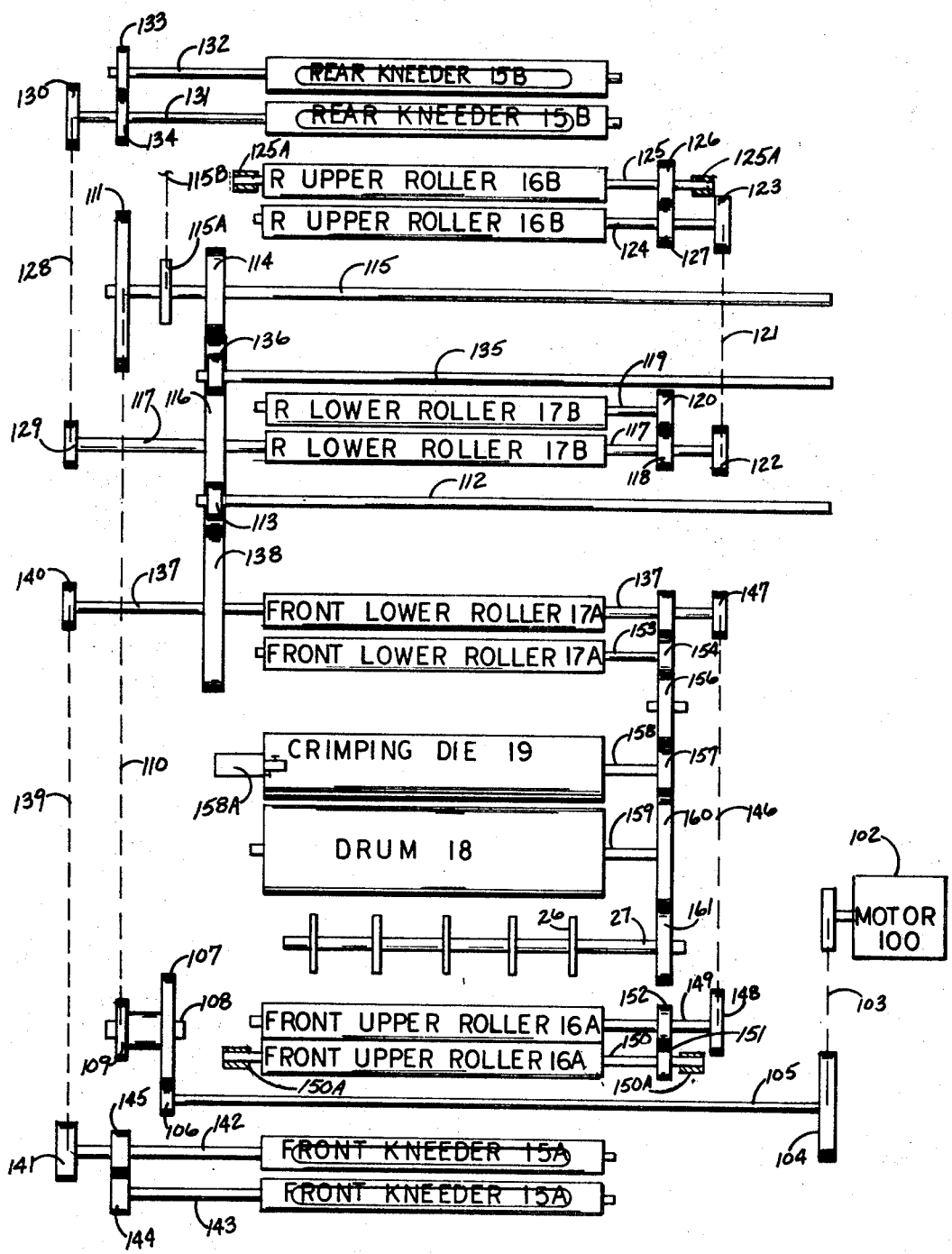

Sept. 20, 1971  P. SHUSTER  3,605,641
RAVIOLI MAKING MACHINE
Filed July 22, 1969  8 Sheets-Sheet 8
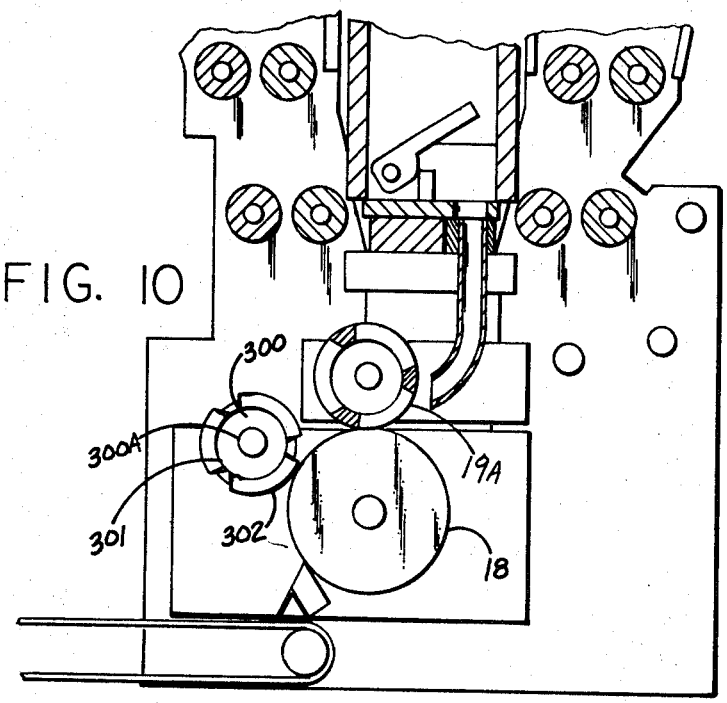
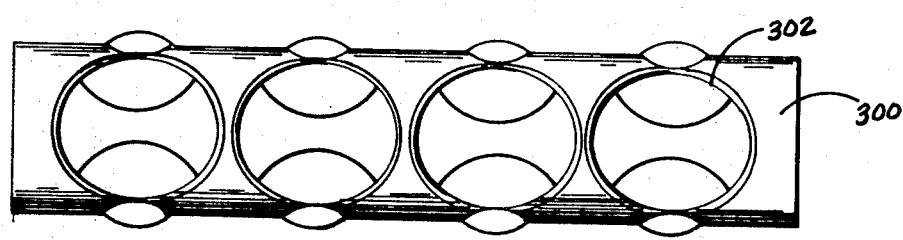
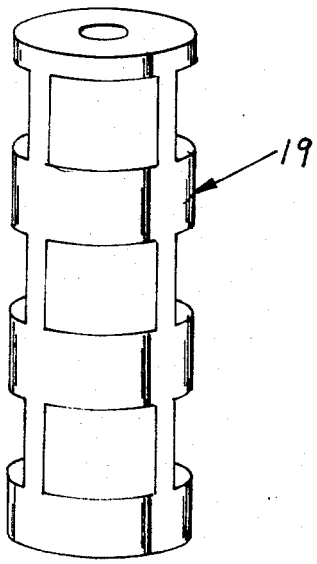
INVENTOR.
PHILIP SHUSTER
BY
ATTORNEY

United States Patent Office 3,605,641
Patented Sept. 20, 1971

3,605,641
RAVIOLI MAKING MACHINE
Philip Shuster, Monsey, N.Y., assignor to
Power Mount Corporation, Passaic, N.J.
Filed July 22, 1969, Ser. No. 843,329
Int. Cl. A21c *11/08*
U.S. Cl. 107—1A                                    4 Claims

ABSTRACT OF THE DISCLOSURE

This disclosure is directed to a machine for producing ravioli featuring readily interchangeable assembly of guide tubes through which the fill material is dispensed to form consecutive rows of ravioli, an adjustable stroke metering pump for controlling the amount of the individual portions of fill material, means for interchanging various crimping dies and for adjusting the stroke frequency of the pump in relation to particular crimping dies for enclosing such portions of fill material between two moving dough sheets for producing various sizes of ravioli. For each size or shape of crimping die adapted to be interchangeably used on the machine, the stroke of the metering pump is rendered readily adjustable to synchronize the frequency thereof to a given size crimping die.

BACKGROUND AND SUMMARY OF THE INVENTION

The present invention relates in general to filled dough food products such as ravioli and the like, and more particularly to a machine for making ravioli. In general, ravioli making machines have been known for some time, as exemplified in U.S. Pat. No. 2,227,728 issued to L. G. Lombi in January 1941.

Basically, in the production of ravioli, portions of a fill material, such as cheese, ground meat, etc. are introduced between two moving sheets of dough and these dough sheets are pressed together to form pockets enclosing individual portions of fill material.

Heretofore, the known constructions of such pocket filling machines were relatively difficult to clean and/or to prepare in changing over from one kind of filling material to another, and/or to vary the size of the dough pockets to be filled. Accordingly, a considerable amount of down time was heretofore required to prepare for such change over with the known constructions. This was because the known constructions were geared to manufacture a particular size ravioli, and not constructed so as to be provided with interchangeable parts which would readily adapt the machine to make varying size products. To accomplish this it is necessary that the proportion of the fill be varied, that the size of the dough pockets formed be varied accordingly, as well as controlling spacing of the dough cutters and timing the movement of the moving parts to effect the necessary synchronization to render this versatility in a single machine possible.

To satisfy the demands of the market for various sizes and shapes of ravioli products, it is important that any machine intended for commercial production of ravioli be capable of interchangeable operation for setting up a variety of set-up configurations, as many as needed to cover the number of different ravioli patterns anticipated.

This invention provides a ravioli making machine in which the parts can be readily interchanged and adjusted so as to enable the machine to be readily set-up for production of any one of several selectable ravioli patterns or shapes.

Essentially, the invention provides interchangeable assemblies of guide tubes utilized in conjunction with the fill box of the machine, the fill box having a pump means installed therein, and means for adjusting the drive location or stroke frequency of the pump means so as to create a maximum pump action within the fill box and which is synchronized to complement the interchangeable parts which control the size and/or number of products being formed.

The guide tubes extend from the bottom of the fill box and serve for dispensing the fill material into predetermined deposit zones between the dough sheets, the number, spacing and size of the tubes corresponding to the number of ravioli per row and the spacing between the filled centers of adjoining ravioli in the row.

The metering pump operatively associated in the fill box provides for positive delivery of the fill material into the deposit zones, and has a plurality of pre-settable strokes to permit selective frequency of oscillation to control the amount of fill material or portions dispensed to suit the various requirements of production for various size dough pockets.

The spacing between consecutive rows of ravioli is established by the means which synchronized each stroke or frequency of the metering pump to the speed of the dough sheets and the particular crimping means operating thereon to form the pockets, i.e., one row of ravioli being formed with each pump stroke.

In addition to the foregoing features, the invention provides a ravioli making machine which can accommodate a variety of interchangeable rotary dies to form ravioli having correspondingly different pocket shapes and sizes. Operatively associated with each rotary die is an index disk or means for controlling the operation of an electromechantcal knife in synchronism with the movement of the pocket forming rotary die to score or cut along the dough web between adjoining rows of ravioli.

A series of axially spaced apart rotary knives serves for scoring along the dough webs between adjoining ravioli in the same row, such that the ravioli product thus formed can be easily separated into individual ravioli for cooking by the consumer.

The axially spaced rotary knives are rendered adjustable and the entire shaft supporting the rotary knives can be readily removed, and another group of differently spaced rotary knives can be readily substituted, depending on the particular sized pockets being formed.

The various features of novelty which characterize the invention are set forth in the claims annexed to and forming a part of this specification. For a better understanding of the invention, its operating advantages, and specific objects attained by its use, reference should be had to the accompanying drawing and descriptive matter wherein there is illustrated and described a preferred embodiment of the invention.

A feature of this invention resides in the provision of mounting the fill tubes on an interchangeable block which permits a quick and expedient change over of fill tubes required for varying the various quantities of fill substances required by various sized dough pockets formed by the apparatus.

Another feature resides in the positive pump displacement occurring within the fill box which at the end of the pump stroke causes a vacuum or suction stroke to occur resulting in a negative back pressure which prohibits dripping or excess flow of the fill material through the fill tubes; thereby providing for a precise amount of fill material being dispensed upon each operation.

Another feature resides in the provision of locating all of the gearing on one side of the apparatus so as to facilitate the interchangeability of the various component parts, i.e., the cutting dies, the fill box components and/or the cutting means etc.

BRIEF DESCRIPTION OF THE DRAWING

In the drawing:

FIG. 6 is a perspective view, partly broken away, illustrating the means provided in the machine of FIG. 1, for dispensing the filler material employed in the production of ravioli thereby.

FIG. 7 is a top view of the interchangeable guide tube assembly used in the filler material dispensing means shown in FIG. 6.

FIG. 8 is a sectional view of the guide tube assembly shown in FIG. 7 as taken along line 8—8 therein.

FIG. 9 is a diagrammatical showing of the drive mechanism of the described invention.

FIG. 10 is a detail showing of the modified cutting roller in assembly. FIG. 11 is a detail showing of the cutting die of FIG. 10.

FIG. 12 is a detail of a typical crimping die.

FIG. 13 is a detail of a round ravioli made by the roller cutter of FIGS. 9 and 10.

DESCRIPTION OF THE PREFERRED EMBODIMENTS OF THE INVENTION

Figure 1:
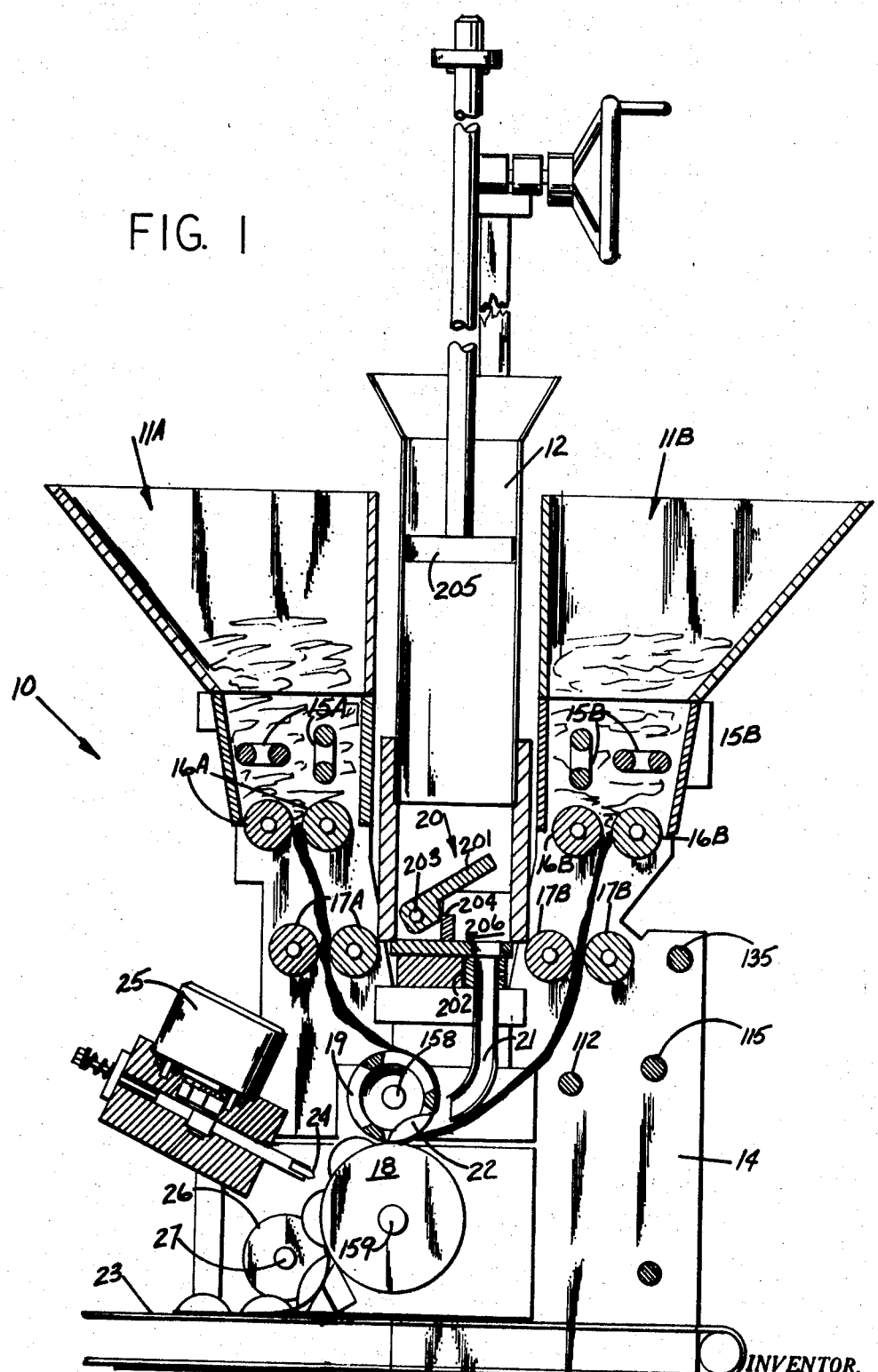
FIG. 1 is a side elevation view, partly in section, of a ravioli making machine constructed in accordance with a preferred embodiment of the invention.
Figure 2:
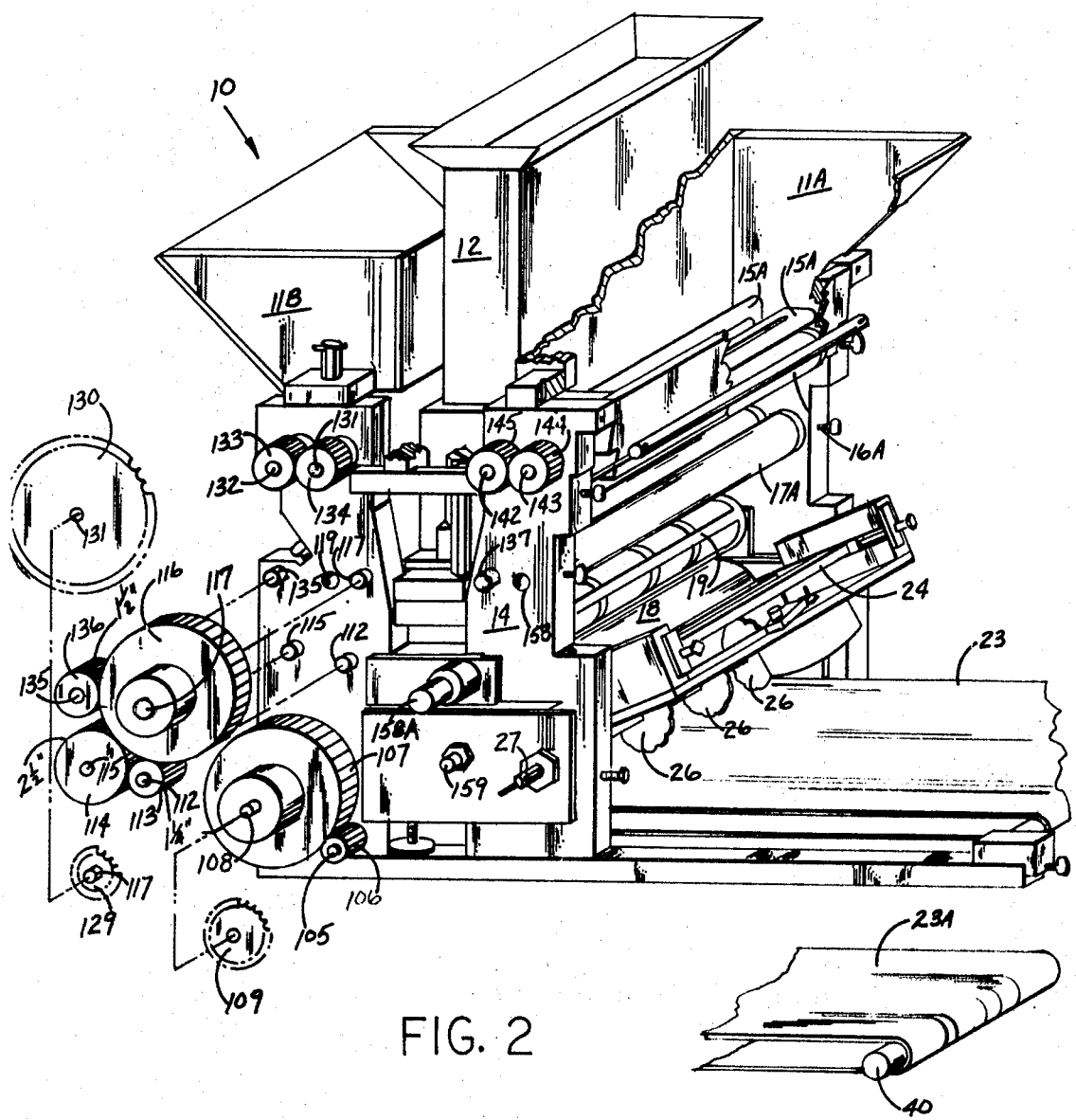
FIG. 2 is a perspective view of the ravioli machine of FIG. 1 shown partly broken away and with some of its parts illustrated in exploded assembly form.
Figure 3:
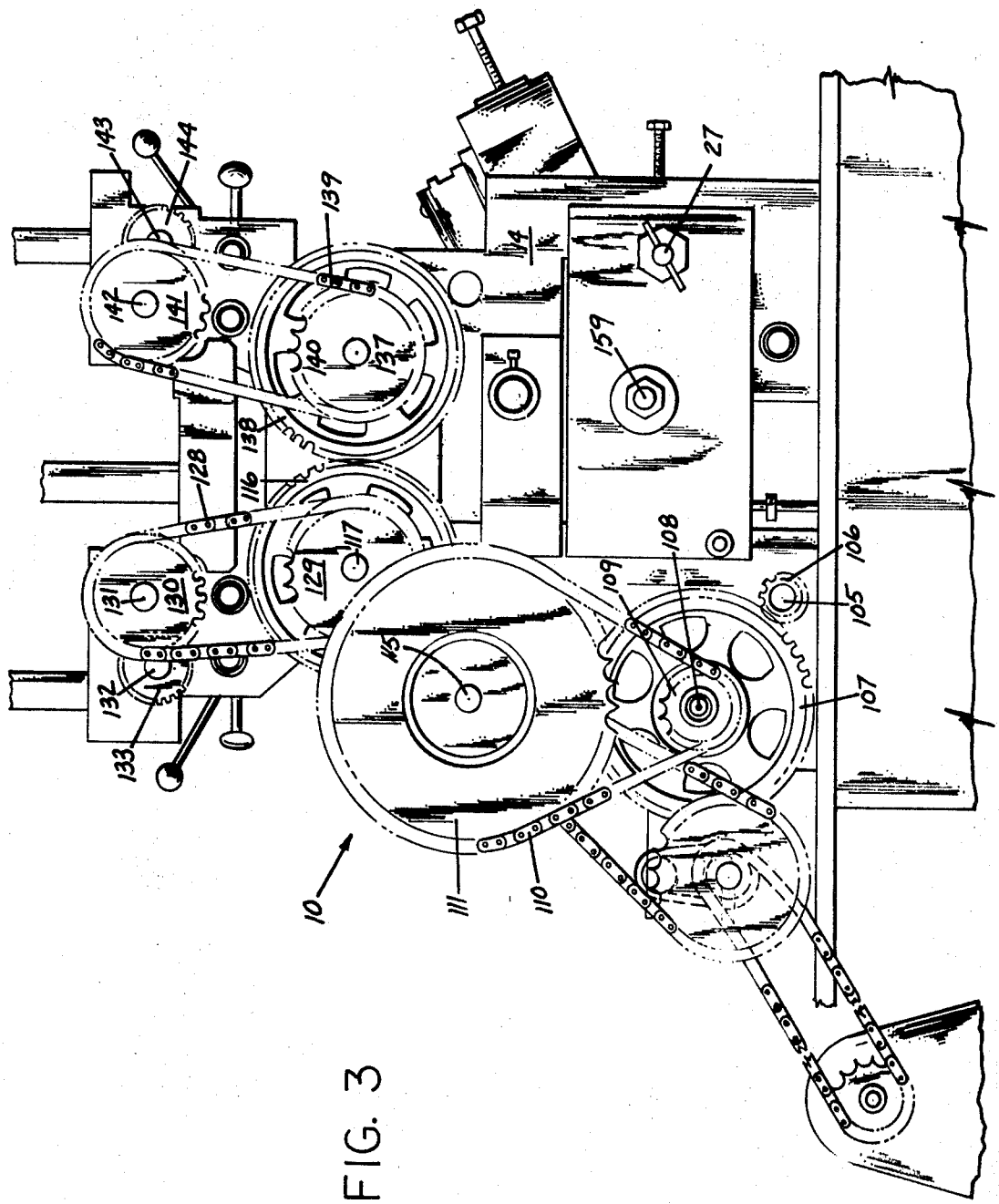
FIG. 3 is a left side elevation view of the ravioli making machine of FIG. 1 as seen in its normally assembled condition.
Figure 4:
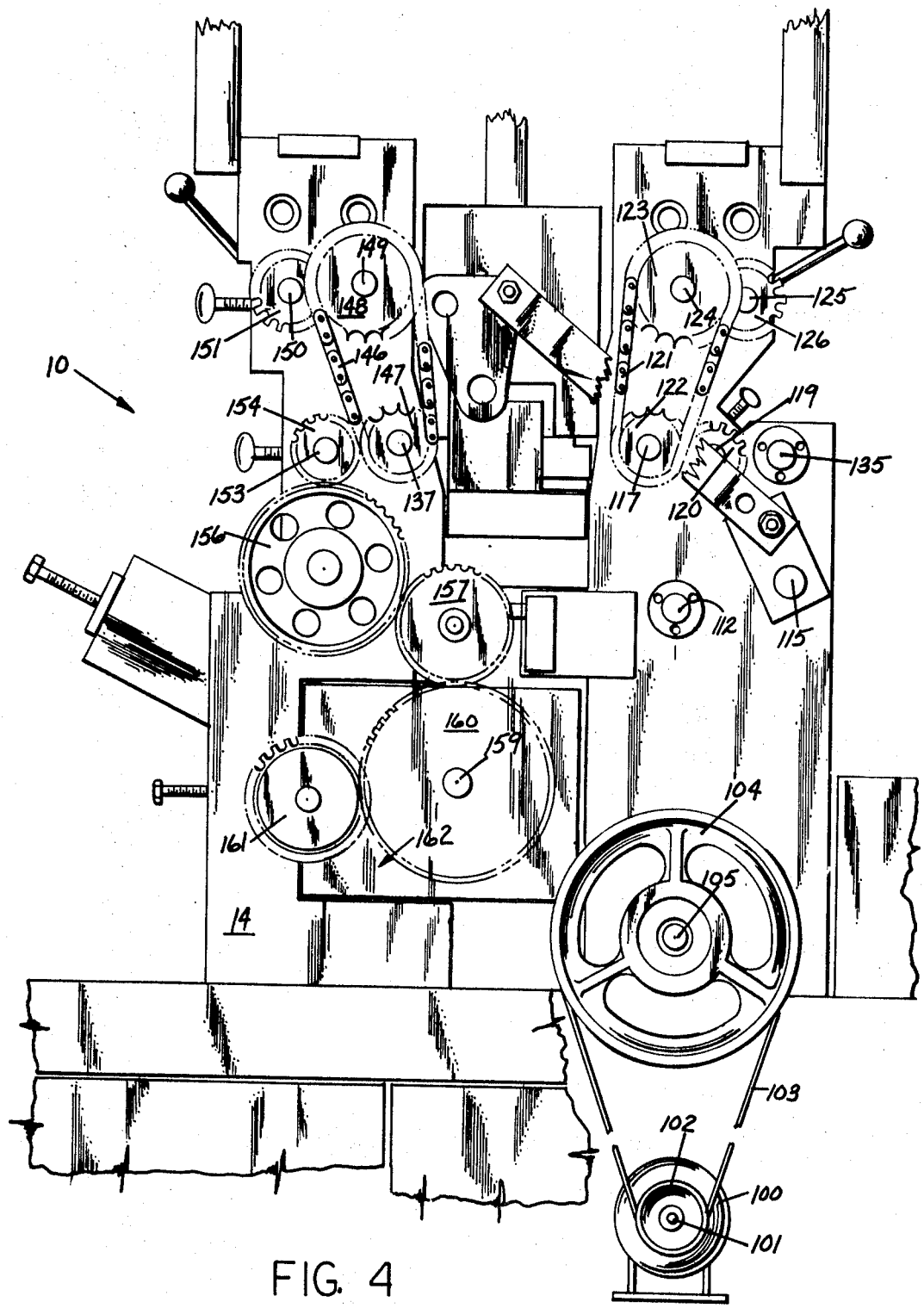
FIG. 4 is a right side elevation view of the ravioli making machine of FIG. 1 as seen in its normally assembled condition, but with some parts broken away to more clearly illustrate certain hidden parts.

As exemplified in FIG. 1, the ravioli making machine 10 has a front dough box 11A, a rear dough box 11B, a fill box 12 positioned between front and rear dough boxes 11A and 11B, and a base frame 14 which supports the boxes 11A, 11B, 12 and the working parts of the machine 10, as will be hereinafter described.

Within each of the dough boxes 11A, 11B are a pair of power driven kneaders 15A, 15B which serve to keep the dough contents of the respective boxes 11A, 11B in a homogeneously mixed state, and which serve to push the dough through the rollers 16A or 16B at the bottom outlet of each box 11A, 11B. The power driven rolls 16A, 16B feed out the dough in continuous strips extending in width along the longitudinal dimensions of the paired rolls 16A, 16B, i.e. perpendicular to the plane of FIG. 1. The dough strip from the rear box 11B passes through a second pair of power driven rolls 17B for sizing thereby to a predetermined reduced thickness, and thence passes onto a power driven rotary drum 18 to form the bottom dough layer of the ravioli product or dough product. The dough strip from the front box 11A passes through a second pair of power driven rolls 17A, similar to the rolls 17B, and is sized by rolls 17A to a predetermined reduced thickness, and thence passes around a power driven rotary crimping or pocket forming die 19 to form the top dough layer of the ravioli or pocket filled dough product.

The spacing between rollers 16A, 16A and 17B, 17B can be adjusted to vary the thickness of the dough sheet being formed therebetween by means of an eccentric bearing or adjustment 125A, 150A supporting the respective shafts 125, 150 of one of rollers 16A, 16B. See FIG. 9. By adjusting the relative position of the eccentrics 125A, 150A relative to the respective shaft 125, 150 of rollers 16A, 16B supported thereon, the spacing between the pairs of rollers 16A, 16A, or 16B, 16B can be adjusted accordingly.

The fill material, which can be cheese, ground meat, or other suitable fill is dispensed from the fill box 12 by a metering pump 20 which forces the fill out through a plurality of guide or fill tubes 21 into corresponding zones 22 between the two sheets of dough.

As described herein, the apparatus 10 mass produces consecutive rows of individual ravioli joined together in a checkerboard style array in the form of a continuous belt for easy handling and removal from machine 10 by a belt conveyor 23. Means are provided to perforate or score the continuously connected rows of ravioli along their boundary lines so that they can be easily cut or separated.

The number of ravioli in a given row corresponds to the number of guide tubes 21 and accordingly, the guide tubes 21 are spaced apart from one another in a direction parallel to the axes of a backing drum 18 and forming or crimping die 19, by distances corresponding to substantially the intended spacing between the filled portions of adjacent ravioli.

Drum 18 and die 19 counterrotate about axes 159, 158 respectively spaced-apart such that die 19 periodically presses the top dough sheet against the bottom dough sheet to form pockets enclosing the individual portions of fill material therebetween and dispensed from tubes 21.

Scoring of the ravioli product thus formed along the boundary lines defining consecutively adjoining rows of ravioli or transversely of the dough sheet is accomplished by means of an elongated knife 24 that extends parallel to the axis of drum 18 and is reciprocably driven by an electrically operated solenoid 25. The operation of knife 24 is synchronized with the ravioli production rate of die 19 so that the edge of knife 24 is advanced toward drum 18 to score the product only along the intervening dough web between adjoining rows of ravioli, thus precluding any danger of cutting into the filled pocket portions of the product.

Scoring of the ravioli product longitudinally or along the boundary lines defining individual ravioli or filled dough product in each row thus formed is accomplished by means of a series of disc knives 26 mounted on a rotatable driven shaft 27 for rotation therewith, the disc knives 26 being axially spaced-apart from one another along shaft 27 by distances corresponding to the width of the individual ravioli, these distances being selected so that the knives 26 cut longitudinally along the dough webs between adjoining ravioli in each row.

As can be better seen from FIGS. 2–5, the machine 10 has a variety of connecting or driving gears, sprockets, chains, etc. mounted on the base frame 14 which serve for driving the various component parts, e.g. the kneaders 15A, 15A, the dough rolls 16A, 16B, 17A, 17B, the drum 18, crimping die 19, metering pump 20, belt conveyor 23, the disc knives 26 in predetermined and cooperative relationship depending upon the particular crimping die, cutter and fill tubes being used.

For expediency, a single motor 100 powers the machine 10 and is mounted to the underside of base frame 14. On the rotary output shaft 101 of the motor 100 is a pulley or sprocket 102 which serves to drive, via a belt 103, another pulley or sprocket 104 mounted on a main drive shaft 105 at the right-side of frame 14.

The main drive shaft 105 extends across frame 14 and at the left side thereof bears a pinion 106. Pinion 106 meshes with a reduction gear 107 mounted on a shaft 108 that also bears a sprocket 109. Sprocket 109 drives a shaft 115 via a chain 110 which passes over sprocket 109 and a sprocket 111 mounted on shaft 115. Referring to FIG. 9, gear 114 mounted on shaft 115 is disposed in driving relationship with gear 116 journalled on shaft 117 to which the lower dough roller 17B is mounted. Gears 113 and 136 also mesh with a gear 116 mounted on a shaft 117.

Shaft 117 is connected to one of the lower dought sizing rolls 17B associated with the dough sheet produced from the rear dough box 11B, and the other of said sizing rolls 17B is connected to a shaft 119 that is driven by shaft 117 in the opposite direction by means of a pinion 118 mounted on shaft 117 to mesh with a pinion 120 mounted on shaft 119.

The upper dough sheet output rolls 16B associated with rear dough box 11B are driven off shaft 117 by means of a chain and sprocket arrangement in which a chain 121 passes around a sprocket 122 mounted on shaft 117 and a sprocket 123 mounted on a shaft 124 connected with one of the rolls 16B. A shaft 125 connected to the other of the upper rear dough rolls 16B is driven in counter-rotation to shaft 124 by means of a pinion 126 mounted on shaft 125 meshing with a pinion 127 mounted on shaft 124.

The kneaders 15B associated with dough box 11B are driven off shaft 117 by another chain and sprocket arrangement wherein a chain 128 passes around a sprocket 129 mounted on shaft 117 and a sprocket 130 mounted on a shaft 131 which is connected to one of the kneaders 15B. The other one of the kneaders 15B is connected to a shaft 132 that bears a pinion 133 meshing with a pinion 134 on shaft 131, such that the kneaders 15B are counter-rotated.

For driving the metering pump 20, three selectable and distinct rotary shaft outputs are provided, one of these being shaft 112, another being shaft 115, and the third being a shaft 135 which is driven off shaft 117 via a gear 136 mounted on shaft 135 to mesh with the gear 116 on shaft 117. Expediently, the shaft 112 is used to drive metering pump 20 at times when the one size of ravioli is being produced, e.g., 1¼ inch size, shaft 115 drives pump 20 when the other size of ravioli is produced, e.g., 2½ inch size, and shaft 136 drives pump 20 in producing still another size of ravioli, e.g., 1½ inch size.

Rotary power for driving the kneaders 15A, upper dough rolls 16A, dough sizing rolls 17A associated with the front dough box 11A, and for driving the dough backing drum 18, crimping die 19 and disc knives 26 is distributed by a shaft 137 bearing a gear 138 that meshes with gear 116 on shaft 117.

The front box kneaders 15A are driven off shaft 137 by a chain and sprocket arrangement in which a chain 139 passes around a sprocket 140 mounted on shaft 137 and a sprocket 141 mounted on a shaft 142 that is connected to one of the kneaders 15A. The other of the kneaders 15A is connected to a shaft 143 bearing a pinion 144 that meshes with a pinion 145 borne on shaft 142 to counter-rotate.

The dough rolls 16A are similarly driven off shaft 137 by means of a chain 146 passing around sprocket 147 mounted on shaft 137 and sprocket 148 mounted on shaft 149, which shaft 149 is connected to one of the upper front dough rolls 16A. The other of the rolls 16A is connected to a shaft 150 bearing a pinion 151 that meshes with a pinion 152 mounted on shaft 149 to counterrotate dough roller 16A on shaft 150.

Dough sizing rolls 17A are driven one directly by shaft 137 and the other by a shaft 153 bearing a pinion 154 that meshes with a pinion 155 mounted on shaft 137.

Pinion 154 meshes with an idler gear 156 that in turn meshes with a gear 157 mounted on a shaft 158 that carries the crimping die 19. It is to be noted that the crimping or cutting die 19 is rendered readily interchangeable so as to enable the apparatus to be readily converted to form ravioli or pocket filled products of varying sizes. For example the illustrated machine, by the appropriate interchangeability of the various component parts can be arranged to form dough filled pockets of approximately 1¼, 1½ or 2½ inches in width or diameter. This is attained by a readily releasable locking pin or plunger 158A by which the crimping or cutting die 19 is rendered readily removable from its respective shaft 158. It will be understood that the crimping die 19 may be formed with different shaped edges to determine various sizes and/or shapes of ravioli pockets.

The dough backing drum 18 is mounted on a shaft 159 bearing a gear 160 that meshes with gear 157 of the crimping die 19 so that the die 19 and drum 18 turn in opposite directions and at a predetermined angular speed ratio established by the ratio of gears 157 and 160.

Disc knives 26 for longitudinal cutting or scoring the rows of connected dough pockets in turn are driven in synchronism with drum 18 by means of a gear 161 mounted on shaft 27 to mesh with gear 160. As shown in FIG. 9, the disc knives are longitudinally spaced along shaft 27.

A pair of upper and lower conveyors 23, 23A are operatively associated with the ravioli making apparatus 10 described for receiving the formed ravoli and for transporting the same away from the ravioli making portion of the machine for packing or boxing. The formed ravioli are first deposited upon an upper conveyor 23, and then deposited upon a lower conveyor 23A, the lower conveyor being disposed in stepped relationship to the upper conveyor 23. Each conveyor 23, 23A is in the form of an endless belt threaded over suitable pairs of end rollers 30 and 40 respectively.

The upper conveyor is driven off of shaft 115 by means of a sprocket 115A and connected driving chain 115B. Chain 115B in turn is connected in driving relationship to the drive end of the upper conveyor 23. The lower conveyor 23A is driven by rotary power off shaft 159 of the dough backing drum 18.

From the foregoing it can be appreciated that in the invention there is provided an overall drive means having a plurality of rotary output shafts 112, 115, 135, 117, 119, 124, 125, 131, 132, 137, 153, 149, 150, 142, 143, 158, 159, and 27, all of which have speeds that are synchronously interrelated. Consequently, both the drum 18 and crimping die 19 will counter-rotate to perform their intended pocket forming function at rates matched to the formation of the dough sheets by the rolls 16A, 16B, 17A, 17B.

The dispensing of the fill material is also performed in synchronism with the dough sheets production and pocket forming action of drum 18 and die 19.

The metering pump 20 for dispensing the fill material includes a flapper blade 201 disposed within the fill box 12 at the bottom outlet thereof, which is sealed by a manifold plate 202 releasably connected to fill box 12 as better seen in FIGS. 6, 7, and 8. The dispensing tubes 21 are supported in a closure plate 203A in a linearly spaced-apart relation to one another and communicate with the slotted opening 202A and the interior of fill box 12. This construction adapts the machine 10 for producing various different sizes of ravioli requiring tubes 21 of different sizes and spacings, since different manifold 202 and tube assemblies 201 can be interchangeably installed in the fill box 12.

Flapper blade 201 is connected to a shaft 203 for oscillatory angular movement thereby relative to fill box 12. With each angular stroke, flapper blade 201 positively displaces a portion of fill material through each of the tubes 21, thereby in conjunction with the action of drum 18 and die 19 forming another row of ravioli product. As flapper blade 201 swings down toward the end of its stroke, its lateral edges wipe against the inside wall surface of box 12 to seal against any substantial escape of fill material back into box 12. A stop bar 204 provided within box 12 serves to limit the travel of flapper blade 201 thereby establishing the end of its stroke, and at the same time sealing along the inside of flapper blade 201 to prevent any further outflow of fill material from tubes 21 as would tend to interfere with the production of clean ravioli. This is highly advantageous since the fill material within box 12 can be kept under pressure, as for example by means of a crank operated piston 205, to facilitate dispensing of the fill material without any danger of spillage. With the fill material pressurized, uniformity of the dispensed portions is assured since each time flapper blade 201 rises to begin another stroke, the volume of box 12 that is swept by blade 201 will be completely filled.

Disposed within the fill box are a plurality of barrier webs 206 subdividing the volume underlying blade 201 within the fill box into separate compartments, each communicating with a single tube 21 to further assure uniformity in fill portion size by preventing such cross flow of the fill material as would tend to favor greater flow through one or more tubes 21. In such case, appropriate slots 207 are provided in blade 201 to permit same to pass by the barrier webs 206 in wiping relationship therewith.

It is to be noted that with the construction of the flapper blade 201 as described, the operation is such that upon the raising of the flapper on each stroke thereof that a negative back pressure is produced. That is, a vacuum or suction is imparted to the fill material as the flapper blade 201 is raised thereby causing the fill material within the guide or fill tube 21 to be sucked up therein at the end of each filling operation. For this reason a definite cut-off point is established during the filling operation which further predetermines the appropriate quantity of fill to be placed in the respective dough pockets. The action of the flapper blade 201 and the suction provided on the back stroke thereof further functions to prohibit dripping of the fill material through the fill tubes 21.

The flapper blade is actuated by a crank member 208 operatively connected to the flapper shaft 203. The crank 208 has a pair of connection points 209A, 209B located at different radii from the center of shaft 203. Another crank member 210 is adapted to be selectively connected to any one of the three shafts 112, 115, and 135 depending upon the size of ravioli to be produced. A connecting link bar 211 is connected between crank member 210 and crank member 208. As noted in FIG. 5, one end of the link may be selectively connected to either point 209A or 209B to vary ravioli size. These three members 208, 210 and 211 define a linkage which converts the continuous rotary motion of the crank 210 driven by either of shafts 112, 115 or 135 into oscillating angular movement of the flapper blade drive shaft 203. The stroke frequency of the oscillatory movement of shaft 203 controlling the flapper 201 is thus established by the rotational speed of the appropriate crank drive shaft 112, 115 or 135. By proper connection of the link 211 and crank 210 a combination of connection points is possible so that variable size ravioli may be formed.

Figure 5:
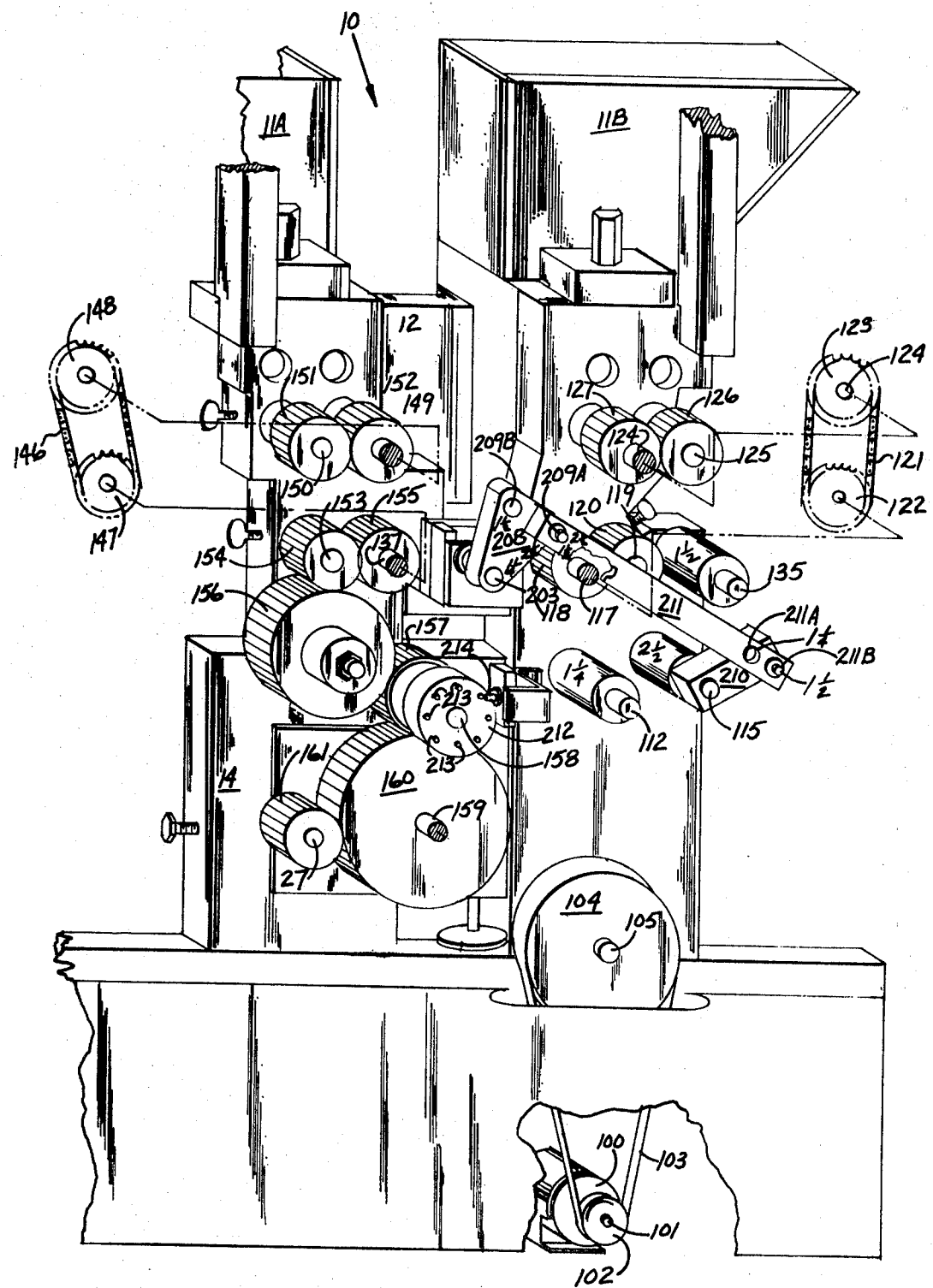
FIG. 5 is a right side elevation view of the ravioli making machine of FIG. 1 shown with some of its parts removed to expose parts hidden in FIG. 4, and with other parts illustrated schematically in exploded assembly form.

Referring to FIG. 5 it will be noted that the connecting link 211 has two connection points 211A, 211B at one end for selective connection to the crank arm 210 and a connection point 211C at its other end which can be selectively connected to crank 208 at either point 209A or 209B.

In the illustrated embodiment, by proper setting of the flapper drive link end 211C on either of points 209A, 209B of the flapper crank 208 and a complementary setting of the other end points 211A, 211B to crank 210 and proper setting of the crank arm 210 to the appropriate drive shaft 112, 115 or 135, the size of the ravioli can be varied, e.g., 1¼, 1½ or 2½ inches. Obviously, other ravioli sizes may be made by allowing for proper gear ratios of the driving gears 113, 114 and 136 of flapper drive shafts 112, 115 and 135 respectively.

Since the available crank 210 drive shafts 112, 115 and 135 are synchronized with the movement of drum 18 and die 19, the dispensing of the fill material is coordinated with the dough pocket forming step.

Referring to FIG. 5, the die 19 drive shaft 158 has mounted thereon for rotation therewith a readily interchangeable disc member 212 having a plurality of trigger members 213 for controlling the action of the transverse cutter 24. These triggers 213 are positioned to engage a microswitch 214 each time die 19 arrives at an index position that corresponds with the arrival of the dough web separating the last two completed rows of ravioli, at a position or drum 18 directly aligned with the travel path of the knife blade 24. Microswitch 214 is connected to the operating solenoid 25 for blade 24 such that each time the die 19 is at an index position, the blade 24 is activated to score or cut the dough web along a line parallel to the drum 18 rotation axis, thereby defining the boundary line between consecutive rows of ravioli.

It should be noted that the provision of such solenoid operated blade 24 renders the machine 10 readily adaptable to automatic operation since such blade 24 can be set to score, but not sever the dough web until a predetermining row count of ravioli is achieved, and then can be activated with a higher solenoid voltage to sever the next following dough web, such that the ravioli product can be separated into convenient lengths of a standard number of rows for easier handling and packaging.

By interchange of appropriate disc members 212 it will be noted that various trigger members 213 set up may be achieved to vary the timing of the knife action. Accordingly, the respective disc members and trigger setting 213 thereon are arranged to complement the setting of the flapper 201 and flapper drive shaft setting so that all of the machine components are complemented to the formation of a particular ravioli size or shape. Of course it will be understood that the crimping die 19 is interchanged for a particular ravioli shape and size. This interchange can be readily effected by a simple releasable catch 158A which secures the die on its shaft 138.

FIG. 10 illustrates a modified cutter means which may be utilized in lieu of the transverse knife 24 and disc knives 26. As shown the modified cutter 300 comprises a roller 301 which is provided with a series of endless cutting edges projecting from the surface of the roller 301 to blank out the ravioli from the continuous dough web. As shown in FIG. 11, the roller is provided with three rows of endless cutting edges, each row being circumferentially spaced about the roller 301. The roller is suitably mounted so as to be readily interchangeable with other cutting rollers, depending on cutter size, on a drive shaft 300A so that the peripheral of the cutter is contiguous to the dough backing drum 18. In the illustrated embodiment the cutter 300 thus enables round ravioli to be blanked from the dough web. It will be understood that the crimping die 19 of FIG. 10 is formed with crimping surfaces sized to complement the endless cutters 302 of the roller cutter 300. In all other respects the construction of the embodiment of FIG. 10 is similar to that hereinbefore described.

While in accordance with the provisions of the statutes in the invention herein has been described in terms of a preferred embodiment, it will be recognized by those skilled in the art that the invention as covered by the following claims can be modified to suit the needs of a particular application, and that certain novel features of the invention can be used without a corresponding use of the other features.

What is claimed is:

1. In a machine for producing ravioli type filled dough products wherein portions of a fill material are introduced between two moving sheets of dough and said dough sheets are pressed together to form pockets enclosing individual portions of fill material, the improvement which comprises in combination a container for holding a supply of fill material, a plurality of tubular members connected to said container to accommodate the dispensing of fill material therefrom into predetermined zones between said two dough sheets, pre-settable stroke metering means disposed within said container for communication with said tubular members and operable to dispense through each of said tubular members a substantially equal portion of fill material upon each operating stroke, and means for regulating the stroke frequency of said metering means in accordance with the speed of said dough sheets to correspondingly regulate the spacing, along the direction in which said dough sheets advance, of consecutive portions of fill material enclosed thereby, said metering means including a flapper blade member disposed within said fill material container for oscillatory angular movement relative thereto and positioned therein to positively displace upon each angular stroke a predetermined portion of fill material through each of said tubular members, a plurality of separate shafts driven at correspondingly distinct speeds, and linkage means connected to said flapper blade and disposed for connection to any one of said shafts to drive said flapper blade at a frequency of oscillation corresponding to the speed of such shaft, said linkage means being adjustable to selectively vary the stroke frequency of said flapper blade to control the dispensing of fill material in the ravioli product in accordance with the setting of said linkage means.

2. In a machine for producing ravioli type filled dough products wherein portions of a fill material are introduced between two moving sheets of dough and said dough sheets are pressed together to form pockets enclosing individual portions of fill material, the improvement which comprises in combination a container for holding a supply of fill material, a plurality of tubular members connected to said container to accommodate the dispensing of fill material therefrom into predetermined zones between said two dough sheets, pre-settable stroke metering means disposed within said container for communication with said tubular members and operable to dispense through each of said tubular members a substantially equal portion of fill material upon each operating stroke, means for regulating the stroke frequency of said metering means in accordance with the speed of said dough sheets to correspondingly regulate the spacing, along the direction in which said dough sheets advance, of consecutive portions of fill material enclosed thereby, drive means having a plurality of rotary output members having speeds synchronously interrelated, means for continuously forming said dough sheets and connected to at least one of said drive means output members for operation thereby, a drum and a rotary die each connected to one of said drive means output members for counterrotation thereby to press said dough sheets together and form said pockets enclosing the fill material portions of the ravioli product, said metering means including a flapper blade disposed within said fill material container to define a pump for metering the fill material dispensed therefrom, said flapper blade being disposed for oscillatory angular movement relative to said container and positioned therein to positively displace upon each angular stroke a portion of fill material through each of said tubular members, linkage means connected to said flapper blade and disposed for connection to at least one of said drive means output members to drive said flapper blade at a frequency of oscillation corresponding to the speed of such output members, said linkage means being adjustable to selectively vary the stroke frequency of said flapper blade to control the dispensing of the portions of fill material in the ravioli product.

3. The improvement according to claim 2 including a solenoid operated blade movable relative to said drum to score said pressed together dough sheets along a line parallel to the drum rotation axis to define the boundary lines between consecutive rows of the ravioli product, a switch means connected to the operating solenoid of said blade, and triggering means connected to said rotary die for rotation therewith and disposed to periodically engage said switch means for activating said solenoid in synchronism with the rotation of said die.

4. The invention as defined in claim 3 wherein said triggering means comprises a readily interchangeable disc having a plurality of circumferentially spaced trigger members, and a switch means operatively connected in circuit with said solenoid, said switch means being actuated by said trigger members upon rotation of said disc.

References Cited
UNITED STATES PATENTS

| | | | |
|---|---|---|---|
| 2,001,792 | 5/1935 | Lombi | 107—1A |
| 2,774,313 | 12/1956 | Lombi | 107—1A |
| 2,814,261 | 11/1957 | Meagher et al. | 107—28 |

PRICE C. FAW, Jr., Primary Examiner

U.S. Cl. X.R.

107—15AF, 28